United States Patent [19]
Yamada et al.

[11] Patent Number: 5,836,821
[45] Date of Patent: Nov. 17, 1998

[54] ELASTIC COUPLING FOR STEERING APPARATUS

[75] Inventors: Masayoshi Yamada; Kenji Hoshino; Isao Fujiu, all of Gunma-ken, Japan

[73] Assignee: Kabushiki Kaisha Yamada Seisakusho, Gunma-ken, Japan

[21] Appl. No.: 816,071

[22] Filed: Mar. 10, 1997

[30] Foreign Application Priority Data

Mar. 13, 1996 [JP] Japan ..................... 8-56248

[51] Int. Cl.⁶ .................. F16C 3/03; F16C 3/76
[52] U.S. Cl. ................ 464/89; 74/492; 280/777; 464/162; 464/180
[58] Field of Search ............... 464/87, 89, 134, 464/182; 74/492; 280/277

[56] References Cited

U.S. PATENT DOCUMENTS

| | | | |
|---|---|---|---|
| 3,878,695 | 4/1975 | Pitner | 464/89 |
| 4,183,258 | 1/1980 | Stephan | 464/89 |
| 4,385,897 | 5/1983 | Mallet | 464/89 |
| 4,479,786 | 10/1984 | De Bisschop | 464/89 |
| 4,983,143 | 1/1991 | Sekine et al. | 464/89 |
| 5,086,661 | 2/1992 | Hancock | 464/89 |
| 5,259,818 | 11/1993 | Kachi et al. | 464/89 |

FOREIGN PATENT DOCUMENTS

| | | | |
|---|---|---|---|
| 2544816 | 10/1984 | France | 464/89 |
| 2637334 | 4/1990 | France | 464/89 |
| 2847541 | 5/1980 | Germany | 464/89 |
| 58-57518 | 4/1983 | Japan . | |
| 5-89964 | 12/1993 | Japan . | |
| 959828 | 6/1964 | United Kingdom | 464/89 |
| 2057632 | 4/1991 | United Kingdom | 464/89 |

*Primary Examiner*—Eileen A. Dunn
*Attorney, Agent, or Firm*—Lowe Hauptman Gopstein Gilman & Berner

[57] ABSTRACT

An elastic coupling for a steering apparatus includes: a thin-walled tubular member; a joint arm which is joined and fixed to the tubular member; an engaging through hole portion formed in a joining portion for joining the tubular member and the joint arm; an elastic bearing member fitted to an inner periphery of the tubular member; and a shaft fitted in the tubular member via the elastic bearing member and adapted to abut against an inner peripheral surface of the engaging through hole portion when the shaft is rotated by more than a predetermined rotating angle.

4 Claims, 12 Drawing Sheets

ELASTIC COUPLING FOR STEERING APPARATUS

BACKGROUND OF THE INVENTION

1. Field of the Invention:

The present invention relates to an elastic shaft coupling for elastically coupling two shafts which transmit a rotating force, and more particularly to an elastic coupling for a steering apparatus which is adapted to isolate vibrations transmitted from a shaft.

2. Description of the Related Art:

As disclosed in Japanese Patent Application Laid-Open No. 89964/1993, a conventional elastic shaft coupling is arranged such that coupling holes for a cross joint are formed in fork-like arm portions of a yoke on one side thereof, a notched portion for a stopper, which serves as a stopper engaging portion, is formed in an intermediate portion of each arm portion. A fitting hole oriented in the axial direction is formed in a proximal portion on the other end side of the yoke.

An elastic member is fitted in this fitting hole, a shaft is inserted in an insertion hole of this elastic member and is fixed in the elastic member, and a stopper member is provided at a distal end of the shaft in such a manner as to extend in the radial direction of the shaft, and is spaced apart a predetermined gap in a rotating direction from the notched portion for a stopper of the yoke. A stopper structure is thus provided wherein when the shaft has rotated about the axis, the stopper member is engaged in the notched portion for a stopper.

This stopper structure is arranged such that when a small torque is transmitted, the torque is transmitted between the shaft and the yoke by the elasticity of the elastic member, and the stopper member and the notched portion for a stopper do not engage each other. In a case where a large torque is transmitted, however, the stopper member which has rotated about the axis engages with the notched portion for a stopper due to the elastic deformation of the elastic member so as to effect transmission of the torque between the shaft and the yoke.

In the stopper structure, the fitting hole for fitting the elastic member is formed in the yoke proximal portion having a diameter equal to the outside diameter of the fork-shaped arm portions of the yoke, such that the inside diameter of the fitting hole becomes the same along the axial direction. The notched portion for a stopper, which serves as a stopper engaging portion, is formed in the opening end portion on the arm portion side of the yoke proximal portion. Specifically, the notched portion for a stopper is formed in a state in which it is open on the arm portion side of the yoke proximal portion. The shaft is located at the axial position of the fitting hole in the elastic member in the yoke proximal portion, and a stopper member (stopper plate) for engagement with the notched portion for a stopper is provided at a distal end of the shaft.

For this reason, the following problems are encountered. First, the length of the arm portion becomes substantially large due to the notched portion for a stopper formed in the opening end portion on the arm portion side in the yoke proximal portion. Consequently, the arm portion is liable to bend with respect to lateral load, thereby possibly lowering the strength of the yoke. Hence, it is necessary to enlarge the wall thickness of the yoke, resulting in a heavy weight.

Secondly, since the stopper member extending in the radial direction is provided at the distal end of the shaft, in order to assemble the shaft and the elastic member into the yoke, the resilient member must be assembled from the fitting hole side, and the shaft provided with the stopper member must be assembled from the arm portion side, i.e., the two members must be fitted from both directions of the yoke. Consequently, the efficiency in assembling operation becomes very poor, making it difficult to improve the productivity.

Thirdly, since the stopper member extending in the radial direction is provided on the shaft, the number of component parts used increases. In addition, even if the stopper member is formed integrally with the shaft, it is difficult to form the radially extending stopper member at the distal end of the long shaft such that the stopper member is located at a satisfactory position with respect to the notched portion for a stopper, which leads to a higher manufacturing cost.

SUMMARY OF THE INVENTION

In view of the above-described circumstances, it is an object of the present invention to provide an elastic coupling for a steering apparatus which is capable of isolating vibrations transmitted from the shaft and improving the assembling efficiency, thereby overcoming the above-described problems.

To this end, in accordance with a first aspect of the present invention, there is provided an elastic coupling for a steering apparatus, comprising: a thin-walled tubular member; a joint arm which is joined and fixed to the tubular member; an engaging through hole portion formed in a joining portion for joining the tubular member and the joint arm; an elastic bearing member fitted to an inner periphery of the tubular member; and a shaft fitted in the tubular member via the elastic bearing member and adapted to abut against an inner peripheral surface of the engaging through hole portion when the shaft is rotated by more than a predetermined rotating angle.

In accordance with the above-described aspect of the invention, the arrangement provided is such that the thin-walled tubular member and the thick-walled joint arm are set in a superposed state and are joined and fixed together, the engaging through hole portion is formed at the joining portion, the shaft is fitted in the tubular member via the elastic bearing member, and the shaft is arranged to abut against the inner peripheral surface of the engaging through hole portion only when the shaft is rotated by more than a predetermined rotating angle. Therefore, the elastic coupling for a steering apparatus can be made compact and lightweight as a whole, it is possible to ensure a sufficient dynamic strength, thereby overcoming the above-described problems.

To describe the above advantage in greater detail, the yoke is comprised of the tubular member and the joint arm, and the tubular member is formed of a thin-walled metal material, while the joint arm is formed of a thick-walled metal material. The tubular member and the joint arm are joined and fixed together, the engaging through hole portion is formed in the joined portion, and the shaft is arranged to abut against the inner peripheral surface of the engaging through hole portion only when the shaft is rotated by more than a predetermined rotating angle.

Therefore, the engaging through hole portion is located in the joining portion for joining the tubular member and the joint arm, and the engaging through hole portion is formed in at least the thick-walled joint arm. Hence, the engaging through hole portion is extremely rigid, and even if the wall thickness of the tubular member is made small, the dynamic strength of the yoke itself can be improved. Moreover, since the tubular member has thin wall thickness, the tubular member can be made lightweight, and hence it is possible to realize a compact ad lightweight steering apparatus.

In accordance with a second aspect of the present invention, there is provided an elastic coupling for a steering apparatus, comprising: a thin-walled tubular member having a joining opening portion at one end thereof; a joint arm having a proximal portion for being joined and fixed to the joining opening portion; an engaging through hole portion located at a joining portion for joining the joining opening portion and the proximal portion; a shaft having an retaining shaft end portion capable of being inserted in the engaging through hole portion and of abutting against the engaging through hole portion when the shaft is at an appropriate rotated angle; and an elastic bearing member which has elasticity between an outer peripheral side and an inner peripheral side thereof in a direction in which the elastic bearing member is compressed by the shaft which rotates, the shaft being disposed on the inner peripheral side thereof and the tubular member being disposed on the outer peripheral side thereof such that the shaft and the tubular member are incapable of rotating idly.

In accordance with the above-described second aspect of the invention, the assembling efficiency can be improved, and the assembly can be facilitated, making it possible to improve the production efficiency. Namely, when the elastic bearing member and the shaft are assembled into the yoke which is constituted by the tubular member and the joint arm, the fitting can be effected in a direction from the side of an accommodating tubular portion of the tubular member toward the joining opening portion side. That is, the elastic bearing member and the shaft can be inserted and assembled with respect to the tubular member from one direction, thereby facilitating the assembling operation (see FIG. 7).

In accordance with a third aspect of the present invention, in the elastic coupling for a steering apparatus according to the first aspect of the invention, the tubular member has a joining opening portion which is inserted and fixed in a through hole formed in a proximal portion of the joint arm. In accordance with this arrangement, various joining means for joining the tubular member and the joint arm can be arbitrarily selected from the following methods. Specifically, assembly can be effected by using a method in which the joining opening portion of the tubular member is inserted into the through hole formed in the proximal portion of the joint arm, and the two members are secured by welding means, or a method in which the joining opening portion of the tubular member is inserted into the through hole formed in the proximal portion of the joint arm by press-fitting means, and by securing the two members by welding means, or by simply press fitting the same.

In accordance with a fourth aspect of the present invention, in the elastic coupling for a steering apparatus according to the first aspect of the invention, a retaining shaft end portion of the shaft has a substantially elliptical cross section and has a pair of opposing parallel surfaces and a pair of opposing arcuate surfaces, and inclined abutment surfaces are respectively formed at corner portions which are each formed by the parallel surface and the arcuate surface. Accordingly, flat inner peripheral surfaces of the engaging through hole portion and the inclined abutment surfaces of the retaining shaft end portion are brought into surface contact with each other. Because of the surface contact, the state of contact can be improved, and it is possible to make it difficult to produce indentations, damage, and the like on both sides, contributing to the realization of a durable steering apparatus.

In accordance with a fifth aspect of the present invention, in the elastic coupling for a steering apparatus according to the first aspect of the invention, the elastic bearing member is constituted by an elastic member and a collar member provided on at least one of an inner peripheral side and an outer peripheral side of the elastic member. Accordingly, the state of contact between the elastic bearing member and the shaft via the collar member, as well as the state of contact between the elastic bearing member and the tubular member, can be improved. At the same time, the fixing characteristic in press fitting is made vary favorable, and the efficiency of assembling the apparatus can also be improved, thereby making it possible to improve the productivity.

The above and other objects, features and advantages of the present invention will become more apparent from the following detailed description of the invention when read in conjunction with the accompanying drawings.

DESCRIPTION OF THE PREFERRED EMBODIMENT

Referring now to the accompanying drawings, a description will be given of an embodiment of the present invention. A yoke in accordance with the present invention is comprised of a tubular member 1 and a joint arm 2, as shown in FIGS. 1 and 2A to 2C. Further, an elastic bearing member 4 and a shaft 5 are fitted in the tubular member 1. The tubular member 1 is formed of a thin-walled metal material. The tubular member 1 is formed by press working or drawing, and has a tubular shape with a substantially elliptical cross section, and the elastic bearing member 4 axially supporting the shaft 5 is press fitted therein.

Figure 3:
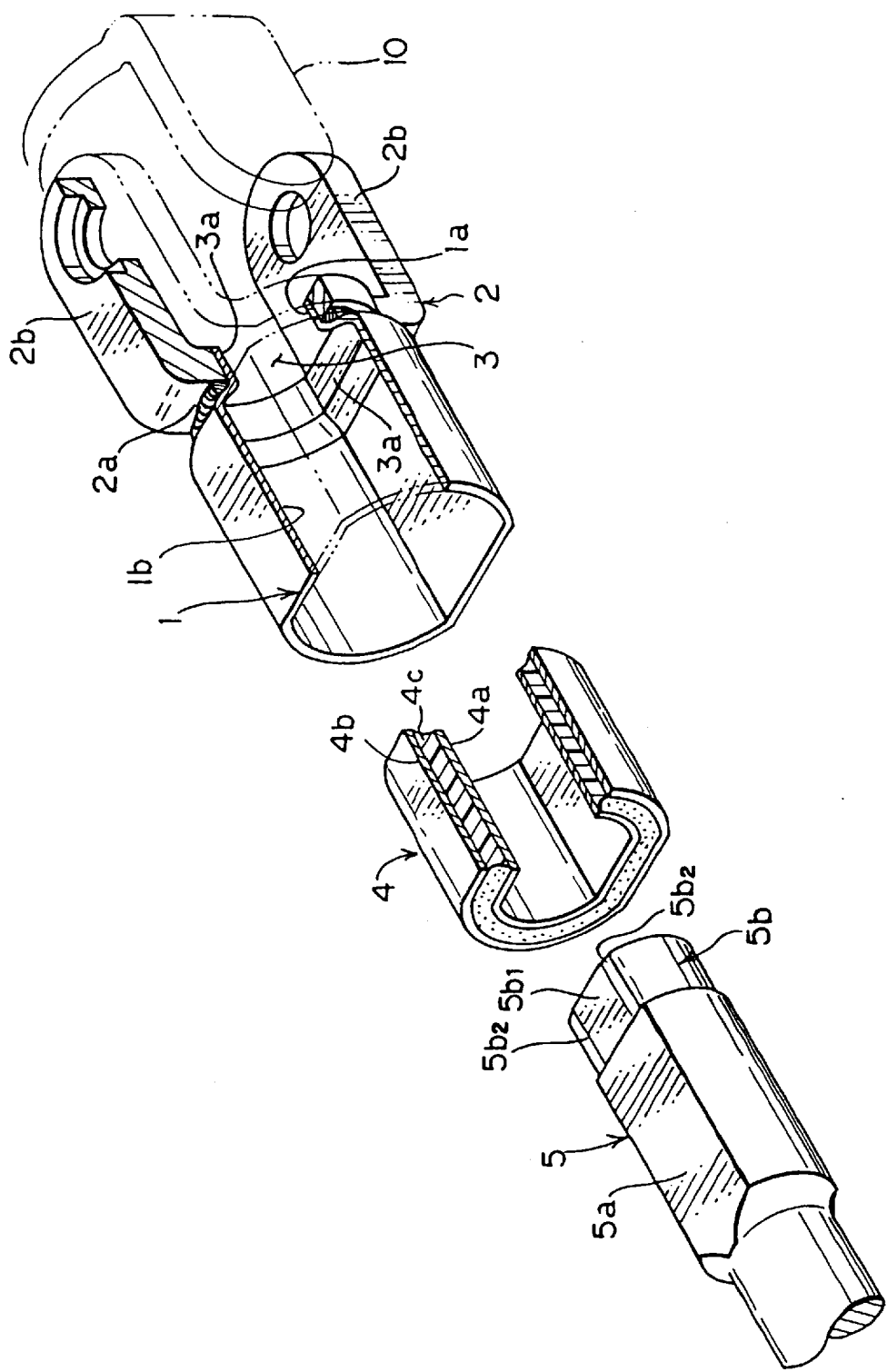
FIG. 3 is an exploded perspective view, partly in section, of the essential portion of the elastic coupling for a steering apparatus in accordance with the present invention.

More specifically, as shown in FIG. 3, the tubular member 1 includes an accommodating tubular portion 1b for accommodating the elastic bearing member 4 and a joining opening portion 1a which is connected to a proximal portion 2a of the joint arm 2. The cross-sectional shapes of the accommodating tubular portion 1b and the joining opening portion 1a are each formed as a substantially elliptical shape in which opposing short-axis portions are parallel to each other and opposing long-axis portions are shaped in the form of circular arcs which are bilaterally symmetrical. As for the tubular member 1, the joining opening portion 1a is formed by being drawn from an end of the accommodating tubular portion 1b such that the cross section of the joining opening portion 1a becomes gradually smaller than the cross section of the accommodating tubular portion 1b.

Figure 1:
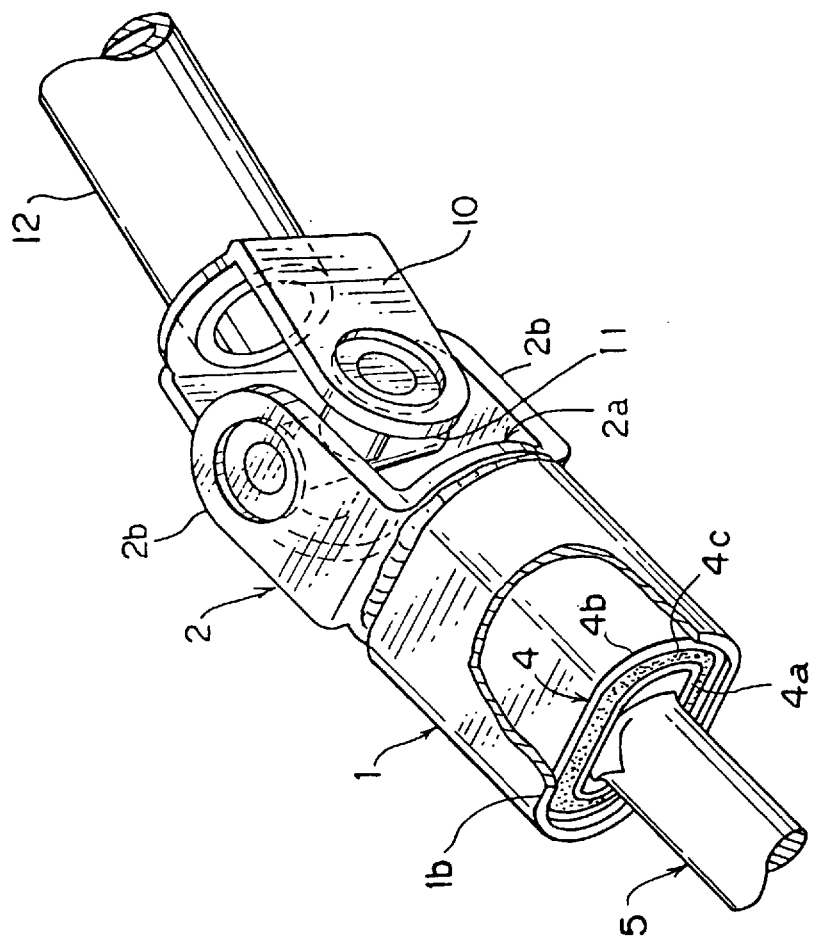
FIG. 1 is a perspective view of an essential portion of an elastic coupling for a steering apparatus in accordance with the present invention.
Figure 2A:
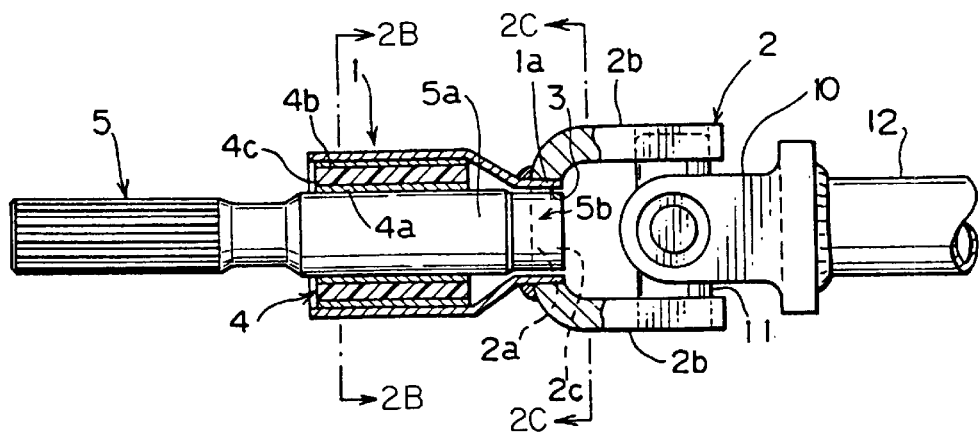
FIG. 2A is a side elevational view, partly in section, of the essential portion of the elastic coupling for a steering apparatus in accordance with the present invention.
Figure 4A:
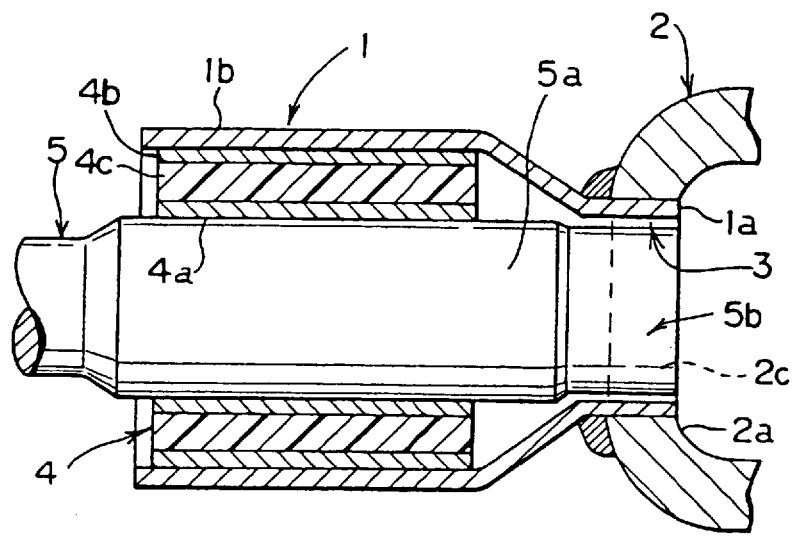
FIG. 4A is an enlarged vertical cross-sectional view of the essential portion of the elastic coupling for a steering apparatus in accordance with the present invention.

The joint arm 2 has a pair of arm portions 2b extending substantially horizontally from vertically opposing sides of the proximal portion 2a, and the arm portions 2b are coupled to arm portions of a mating joint arm 10 by means of a cross joint 11 (see FIGS. 1 and 2A). A through hole 2c is formed in the proximal portion 2a, as shown in, among others, FIGS. 3 and 4A.

The yoke is provided with an engaging through hole 3 which is formed by the through hole 2c in the proximal portion 2a of the joint arm 2 and the joining opening portion 1a of the tubular member 1. The structure provided is such that when the tubular member 1 and the joint arm 2 are connected and fixed together, the joining opening portion 1a of the tubular member 1 is press fitted in the through hole 2c of the joint arm 2, and the tubular member 1 and the joint arm 2 are then secured to each other by welding means (see FIG. 4A).

The elastic bearing member 4 is arranged such that an elastic member 4c is nipped between an inner peripheral-side collar 4a and an outer peripheral-side collar 4b which are formed of a metal (see FIG. 3). The material of the elastic member 4c is natural rubber, synthetic rubber (styrene-butadiene rubber), or the like. The outer peripheral-side collar 4b has a shape similar to the inner peripheral shape of the accommodating tubular portion 1b of the tubular member 1, and is inserted into the tubular member 1 by press fitting means (see FIGS. 1, 2A, and 4A). Meanwhile, the cross-sectional shape of the inner peripheral-side collar 4a is similar to the cross-sectional shape of a borne portion 5a of the shaft 5 which will be described later.

Figure 4B:
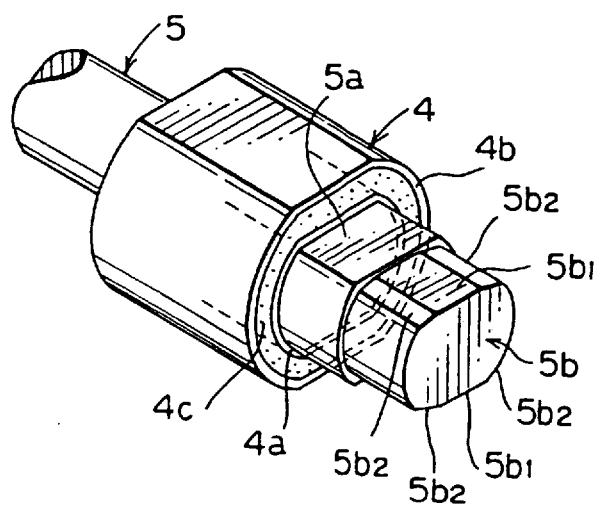
FIG. 4B is a perspective view illustrating an elastic bearing member fitted over a shaft.
Figure 7:
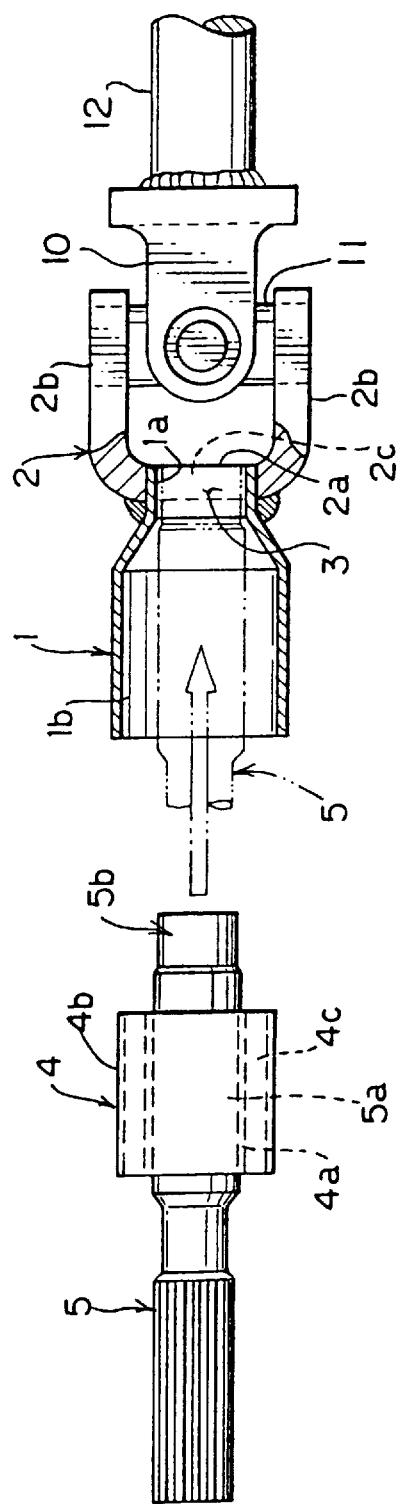
FIG. 7 is a vertical cross-sectional view, partly in section, of an assembling state of the elastic coupling for a steering apparatus in accordance with the present invention.

As shown in FIGS. 4B, and 7, if the elastic bearing member 4 consisting of the inner peripheral-side collar 4a and the outer peripheral-side collar 4b formed of the metal and the elastic member 4c is press fitted in advance over the shaft 5 to set the shaft 5 and the elastic bearing member 4 in a subassembled state, the assembly can be completed by simply inserting the elastic bearing member 4 fitted to the shaft 5 over the tubular member 1 by the press fitting means. Hence, the assembling efficiency improves, so that productivity can be enhanced.

Further, as another type of the elastic bearing member 4, only one of the inner peripheral-side collar 4a and the outer peripheral-side collar 4b is provided on the inner peripheral side of the elastic member 4c or the outer peripheral side of the elastic member 4c, and the other one of the inner peripheral-side collar 4a and the outer peripheral-side collar 4b is bonded to the tubular member 1 or the shaft 5. Still alternatively, the elastic member 4c may be provided between the tubular member 1 and the shaft 5 by fitting the aforementioned collar member (the inner peripheral-side collar 4a or the outer peripheral-side collar 4b) at the time of the molding of the elastic bearing member 4 or by baking the elastic member 4c onto the tubular member 1 or the shaft 5.

As for the methods of assembling the elastic bearing member 4 by fitting the collar member (the inner peripheral-side collar 4a or the outer peripheral-side collar 4b) on either the inner peripheral side or the outer peripheral side of the elastic member 4c and by causing the tubular member 1 or the shaft 5 to be directly fitted to the other side thereof by bonding or baking means, various methods can be used and may be arbitrarily selected in the design.

Figure 12:
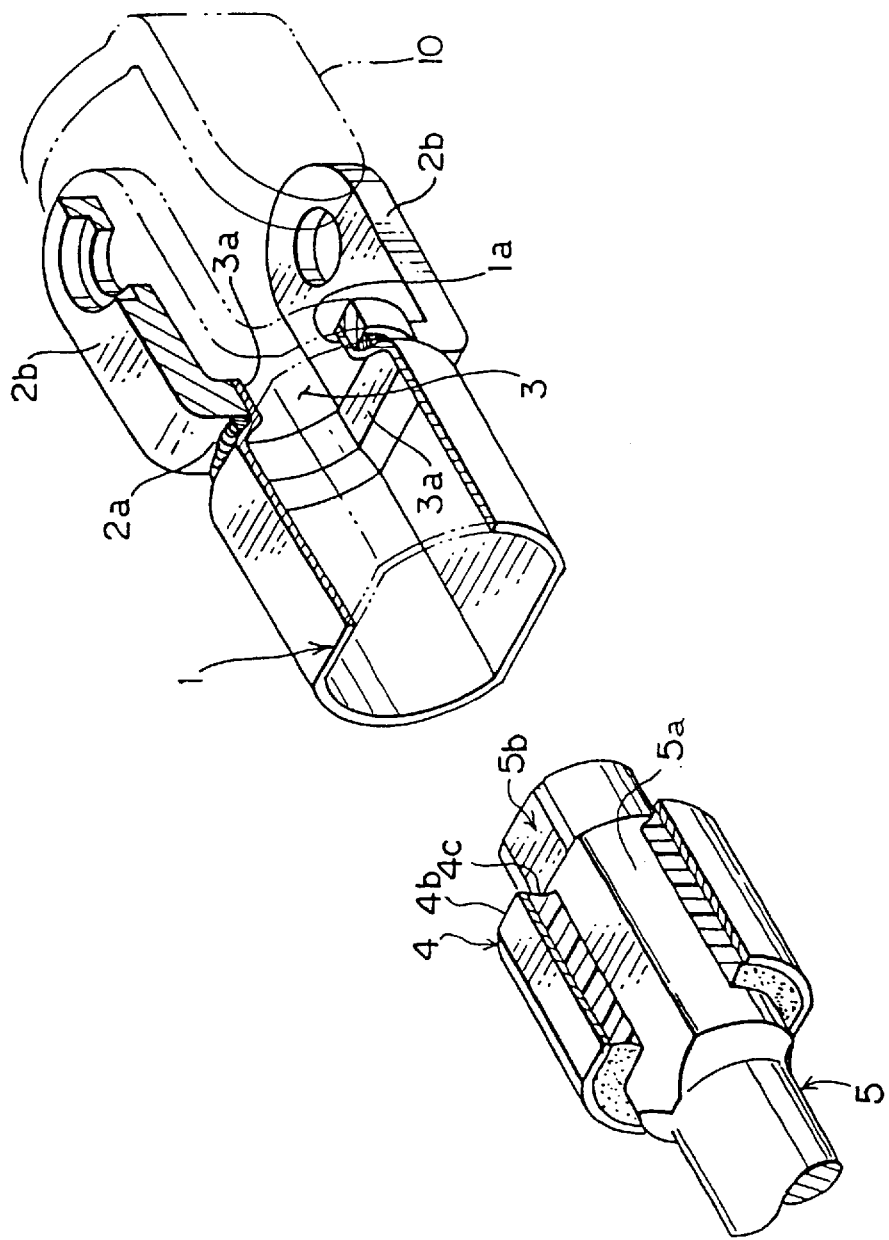
FIG. 12 is an exploded perspective view, partly in section, of the essential portion of the elastic coupling for a steering apparatus having an elastic bearing member of a type in which only an outer peripheral-side collar is provided on an elastic member.
Figure 13A:
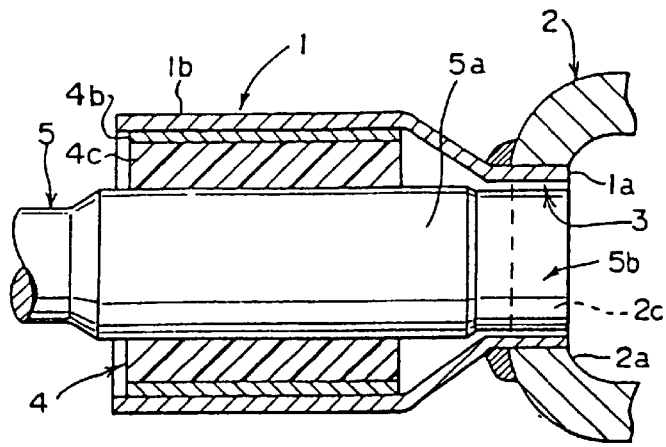
FIG. 13A is a vertical cross-sectional view of the essential portion of the elastic coupling for a steering apparatus having the elastic bearing member of the type in which only the outer peripheral-side collar is provided on the elastic member.
Figure 13B:
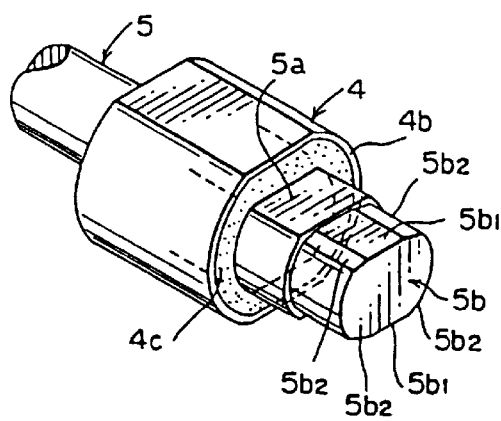
FIG. 13B is a perspective view in which the elastic bearing member of the type in which only the outer peripheral-side collar is provided on the elastic member is fitted over the shaft.

In the type shown in FIGS. 12 and 13A and 13B, the elastic member 4c is assembled onto the shaft 5 by baking the elastic member 4c onto both the shaft 5 and the outer peripheral-side collar 4b, or by baking the elastic member 4c onto the shaft 5 and bonding the elastic member 4c to the outer peripheral-side collar 4b. The shaft and the elastic bearing member 4 may be subassembled in this manner, and the subassembly may be inserted into the tubular member 1.

Figure 14:
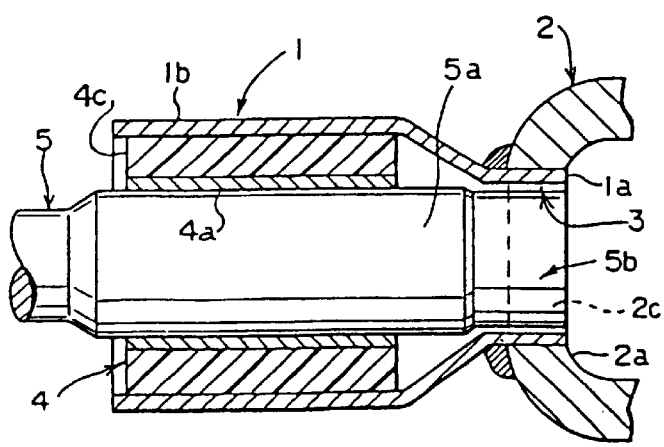
FIG. 14 is a vertical cross-sectional view of the essential portion of the elastic coupling for a steering apparatus having an elastic bearing member of a type in which only an inner peripheral-side collar is provided in the elastic member.

Further, in the type shown in FIG. 14, only the inner peripheral-side collar 4a is provided in the elastic member 4c, and the outer peripheral side of the elastic member 4c is directly fitted to the tubular member 1.

In addition, although not particularly shown, another arrangement may be provided as the elastic bearing member 4 such that, instead of providing the inner peripheral-side collar 4a and the outer peripheral-side collar 4b, the elastic member 4c is provided directly between the tubular member 1 and the shaft 5.

Figure 2B:
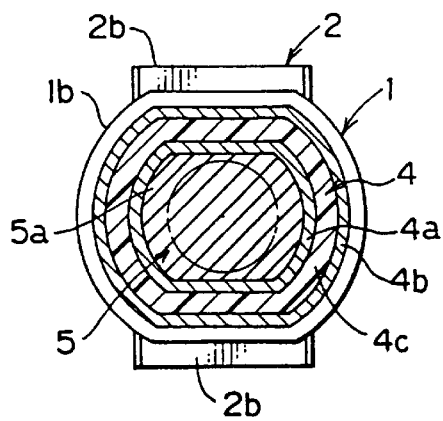
FIG. 2B is a cross-sectional view taken in the direction of arrows along line 2B—2B in FIG. 2A.

As for that shaft 5, as shown in FIGS. 2B and 4B, the borne portion 5a is formed along the axial direction, and a retaining shaft end portion 5b is formed at an end of the borne portion 5a. The borne portion 5a is press fitted to an inner periphery of the inner peripheral-side collar 4a of the elastic bearing member 4. The retaining shaft end portion 5b of the shaft 5 has a substantially elliptical cross section, has a pair of opposing parallel surfaces $5b_1$, and is loosely fitted in the engaging through hole 3 (see FIG. 4B).

Figure 5A:
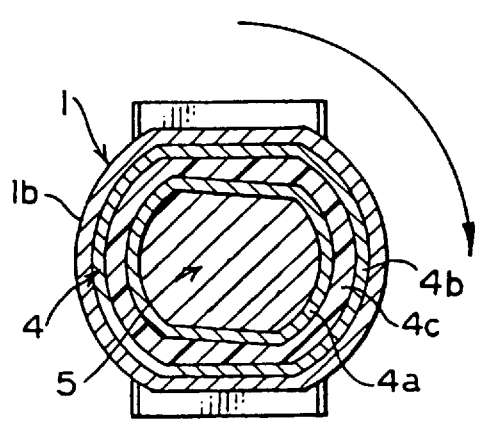
FIG. 5A is a cross-sectional view of the essential portion illustrating a state in which the shaft has rotated by an appropriate angle inside the elastic bearing member, and corresponds to the cross section taken in the direction of arrows 2B—2B in FIG. 2A.
Figure 5B:
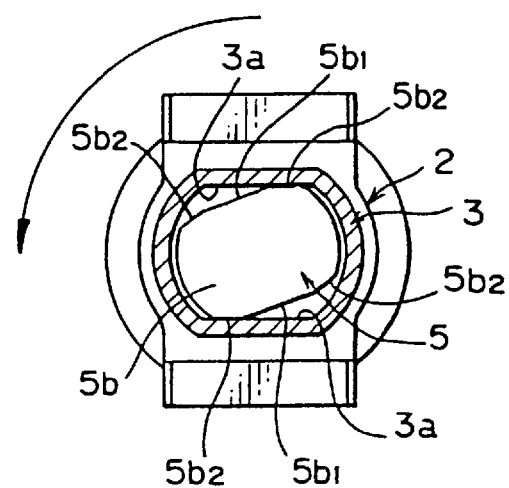
FIG. 5B is a cross-sectional view of the essential portion illustrating a state in which a retaining shaft end portion has rotated by a predetermined angle and has abutted against the inner periphery of an engaging through hole, and corresponds to the cross section taken in the direction of arrows along line 2C—2C in FIG. 2A.
Figure 6A:
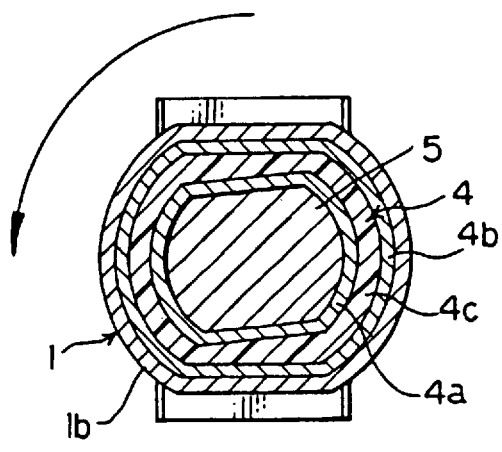
FIG. 6A is an operational diagram, viewed from the tubular member side, of a state in which the shaft has rotated inside the elastic bearing member by an appropriate angle in the direction opposite to that shown in FIG. 5A.
Figure 6B:
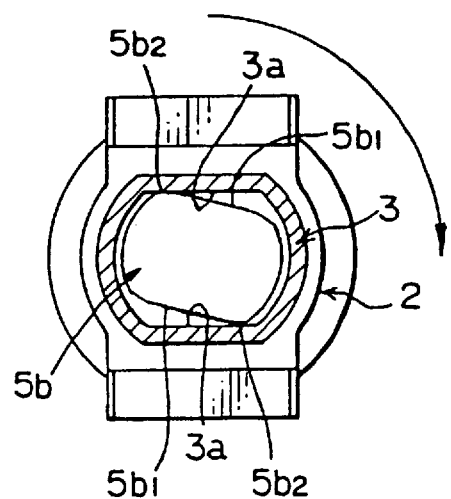
FIG. 6B is an operational diagram, viewed from the joint arm side, of a state in which the retaining shaft end portion has rotated by an appropriate angle in the direction opposite to that shown in FIG. 5A, and has abutted against the inner periphery of the engaging through hole.

Although the retaining shaft end portion 5b has a substantially elliptical cross section and has the parallel surfaces $5b_1$, the cross section of the retaining shaft end portion 5b is slightly smaller than the cross section of the inner periphery defining the engaging through hole 3, though similar. Therefore, the structure provided is such that a gap is formed appropriately between the retaining shaft end portion 5b and the inner periphery of the engaging through hole 3, so that the retaining shaft end portion 5b is provided with leeway for rotating inside the engaging through hole 3 at an appropriate angle (see FIGS. 5B and 6B).

Figure 2C:
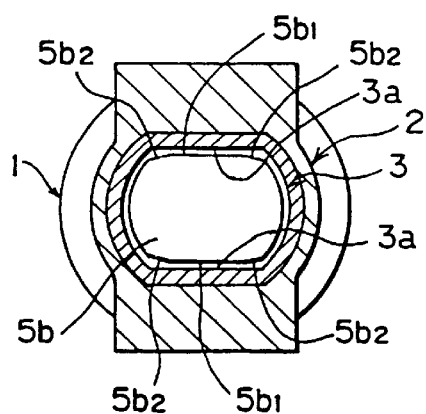
FIG. 2C is a cross-sectional view taken in the direction of arrows along line 2C—2C in FIG. 2A.

Slightly a pair of inclined abutment surfaces $5b_2$ which are slightly inclined are respectively formed at transversely opposite ends of each of the opposing parallel surfaces $5b_1$ of the retaining shaft end portion 5b (see FIGS. 2C, 3, and 4B). Hence, when the shaft 5 has rotated, the inclined abutment surfaces $5b_2$ of the retaining shaft end portion 5b are brought into surface contact with the inner periphery of the engaging through hole 3, thereby making it possible to stabilize the state of abutment (see FIGS. 5B and 6B). Incidentally, it is possible to adopt an arrangement in which the inclined abutment surfaces $5b_2$ are not formed on the retaining shaft end portion 5b. In that case, an opposing pair of flat inner peripheral surfaces 3a are also formed to define the engaging through hole 3 (see FIG. 2C).

As described above, the cross-sectional shape of each of the retaining shaft end portion 5b and the engaging through hole 3 is noncircular and is substantially elliptical. The retaining shaft end portion 5b of the shaft 5 and the engaging through hole 3 constitute a stopper structure whereby the shaft 5 is prevented from rotating with respect to the elastic bearing member 4 by more than a predetermined angle.

Although the cross-sectional shape of each of the inner peripheral surface of the tubular member 1 of the yoke, the inner peripheral-side collar 4a of the elastic bearing member 4, and the borne portion 5a of the shaft 5 is substantially elliptical, but may be formed as a circular cross section if the structure is such that idle rotation with respect to each other is prevented. Thus various arrangements may be selectively adopted as the cross-sectional shapes of these members.

In addition, there are cases where the distal end portion of the shaft 5 is reduced in size, thereby forming a slightly stepped portion. In a case where a load (including vibrations and the like) is applied from the steering and gear box side to the shaft 5 in a direction toward the joint arm 2, it is possible to dampen the projecting force acting in a direction toward the cross joint by virtue of engagement between the surface of the stepped portion and the opening at the joint between the tubular member 1 and the joint arm 2. Further, if the retaining shaft end portion 5b of the shaft 5 is reduced in size, the engaging through hole 3 formed by the joint arm 2 and the tubular member 1 can be made small, and the joint arm 2 of the yoke can be also made compact.

Also, it is, of course, conceivable as an optional design to provide an arrangement in which, if the joint arm 2 is formed to be large, the shape of the shaft 5 is provided with a different cross-section of a substantially elliptical shape in which the shape of the shaft 5 is substantially identical along the axial direction. The mating joint arm 10, which is coupled to a steering column shaft 12, is fixed in coupling and fitting holes of the cross joint 11, provided in face-to-face relation to the joint arm 2 of the yoke, by means of the cross joint 11 (see FIGS. 1 and 2A).

As another example of the structure for joining the tubular member 1 and the joint arm 2, a projecting surface portion $2a_1$ for connection is formed around the through hole 2c in the proximal portion 2a of the joint arm 2, and the projecting surface portion $2a_1$ for connection is press fitted into the joining opening portion 1a of the tubular member 1, and is secured by welding means. In this example, the through hole 2c serves as the engaging through hole 3.

Figure 8A:
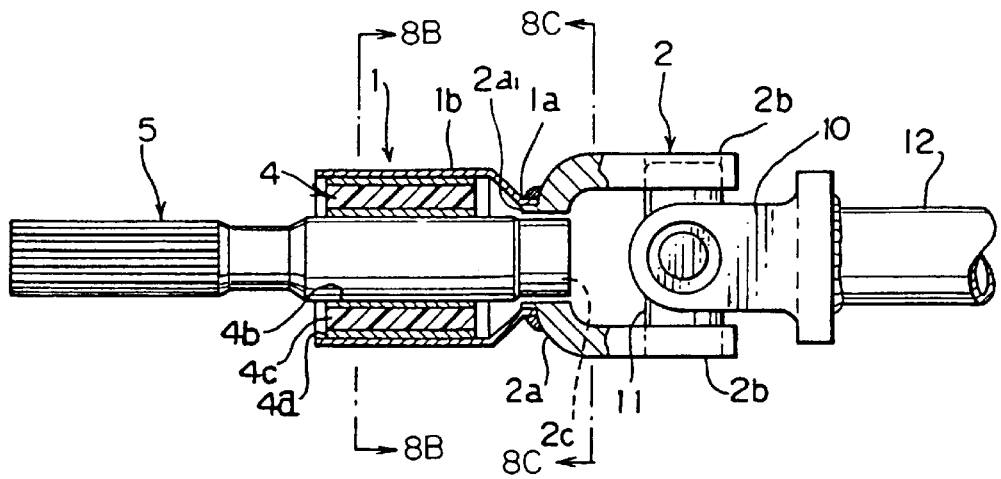
FIG. 8A is a vertical cross-sectional view of the elastic coupling for a steering apparatus in accordance with another embodiment of the present invention.
Figure 8B:
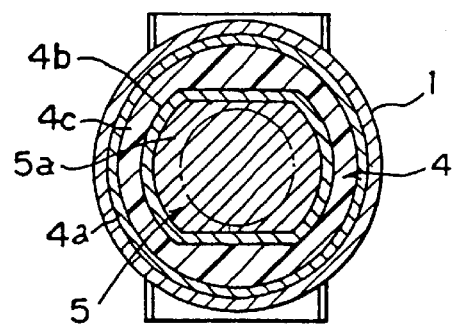
FIG. 8B is a cross-sectional view taken in the direction of arrows along line 8B—8B in FIG. 8A.
Figure 8C:
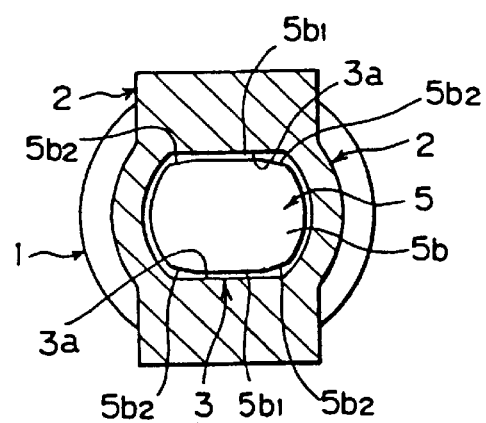
FIG. 8C is a cross-sectional view taken in the direction of arrows along line 8C—8C in FIG. 8A.
Figure 9:
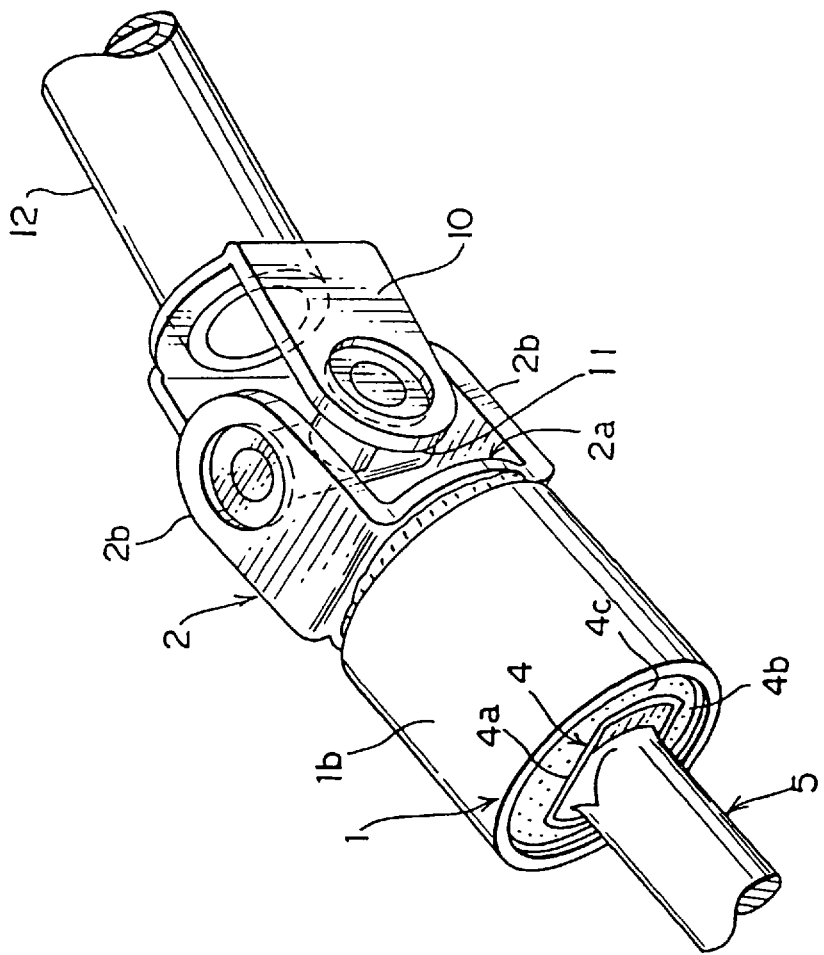
FIG. 9 is a perspective view of the essential portion of the elastic coupling for a steering apparatus in accordance with still another embodiment of the present invention.
Figure 10:
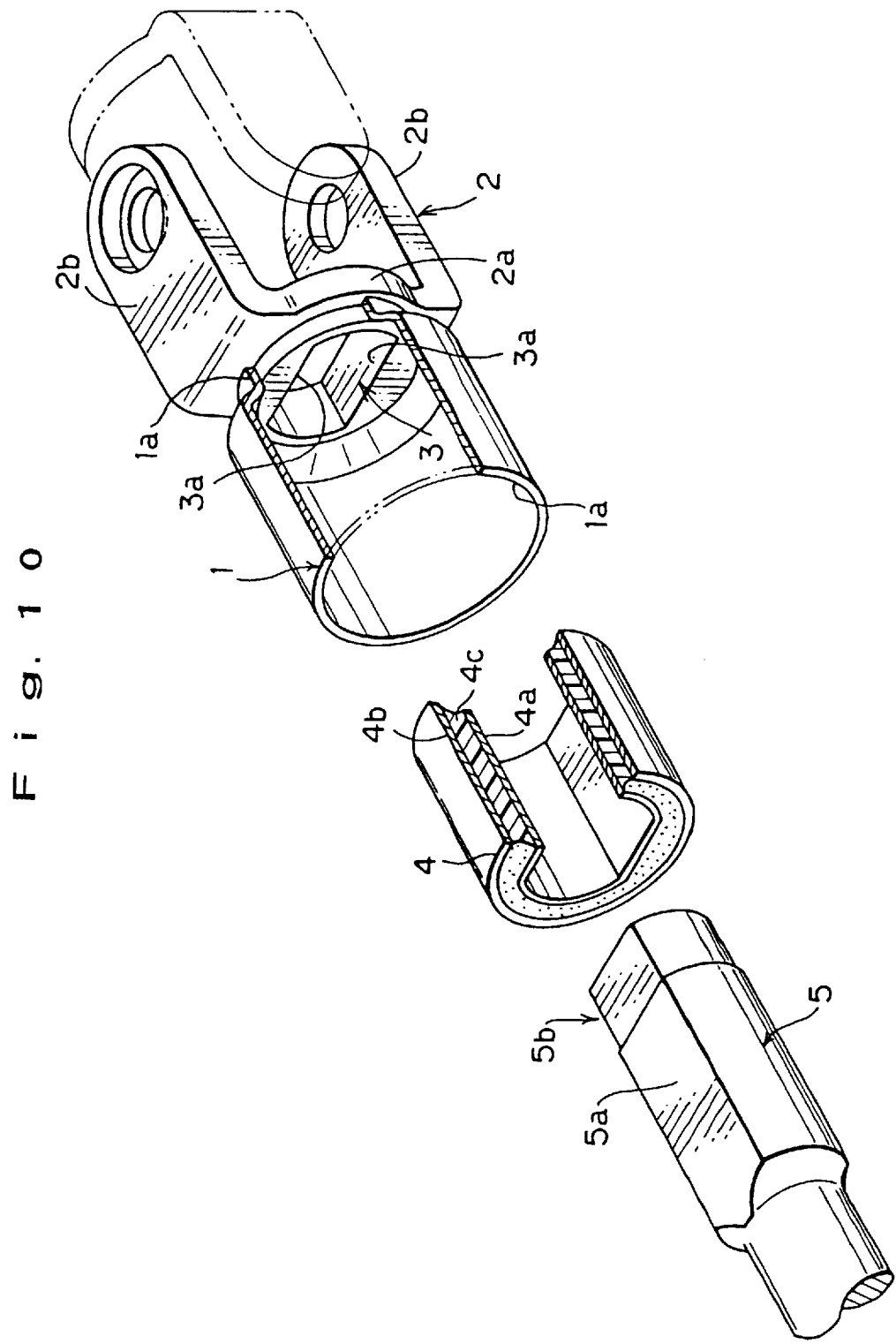
FIG. 10 is an exploded perspective view of the essential portion of the elastic coupling for a steering apparatus in accordance with a further embodiment of the present invention.
Figure 11:
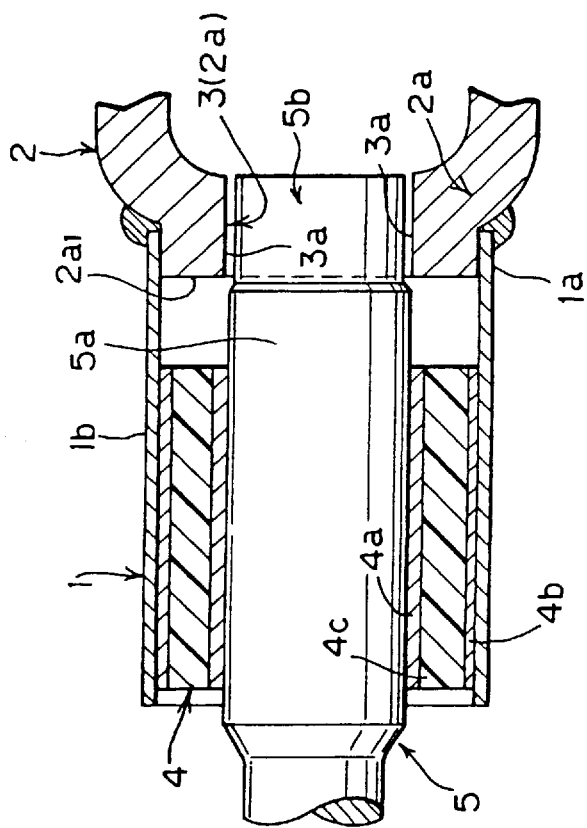
FIG. 11 is an exploded perspective view of the essential portion of the elastic coupling for a steering apparatus in accordance with a still further embodiment of the present invention.

In addition, as shown in FIGS. 8B, 9, and 10, the tubular member 1 is provided with a circular cross section and is arranged such that the elastic bearing member 4 is press fitted therein and does not rotate idly inside the accommodating tubular portion 1b of the tubular member 1 (see FIGS. 8A and 8B). Further, in FIG. 11, the tubular member 1 has a hollow cylindrical shape, and the accommodating tubular portion 1b and the joining opening portion 1a are provided with an identical inside diameter. The outside diameter of the projecting surface portion $2a_1$ for connection of the proximal portion 2a of the joint arm 2 is made identical with the inside diameter of the tubular member 1.

Thus, the stopper structure is adopted in which the shaft 5 which is coupled to the steering gear box is held in the tubular member 1 of the yoke (the combination of the joint arm 2 and the tubular member 1), and the retaining shaft end portion 5b of the shaft 5 is inserted in the engaging through hole 3 formed at the connecting portion between the joint arm 2 and the tubular member 1. Vibrations, such as vibrations picked up from the road surface via the steering gear box and engine vibrations, are transmitted to the shaft 5, but are absorbed by the elastic bearing member 4 provided in the tubular member 1 of the yoke, thereby making it possible to provide a vibration isolating structure for the steering.

The elastic bearing member 4 allows the steering torque applied to the steering column shaft 12 to be transmitted from the shaft 5 to the steering gear box side via the tubular member 1 of the yoke. Normally, the retaining shaft end portion 5b of the shaft 5 is in a state of noncontact with the engaging through hole 3 in the yoke into which the retaining shaft end portion 5b is inserted, and a slight gap is present therebetween (see FIGS. 2A, 2C, and 4A).

Next, in a state in which the aforementioned steering torque has exceeded the normal range, i.e., at the time of stationary steering (the steering of the steering wheel when the vehicle is at a standstill), or such as when the steering torque has been applied to the left or right end position, a greater steering torque is applied to the yoke and the shaft 5 than at the normal time. If this steering torque continues to be applied to the elastic bearing member 4, the elastic member 4c of the elastic bearing member 4 is wrenched by the steering torque, with the result that the elasticity, the restoring feature, and the like of the elastic bearing member 4 deteriorate.

Therefore, the inner periphery of the engaging through hole 3 of the yoke and the retaining shaft end portion 5b of the shaft 5 engage and abut against each other, acting in such a way as to serve as a stopper for the rotation of the elastic bearing member 4, thereby preventing the wrenching of the elastic member 4c of the elastic bearing member 4. Since the retaining shaft end portion 5b is provided with the parallel surfaces $5b_1$ and the inclined abutment surfaces $5b_2$ formed at transversely opposite ends thereof, the retaining shaft end portion 5b, when subjected to a steering torque of a fixed level or more, rotates in the engaging through hole 3, and the inclined abutment surfaces $5b_2$ respectively abut against the flat inner peripheral surfaces 3a of the engaging through hole 3.

In this abutting state, a greater steering torque ceases to be applied to the elastic bearing member 4. Then, the transmission of the rotation of the yoke and the shaft 5 is effected by the direct contact between the retaining shaft end portion 5b of the shaft 5 and the inner periphery of the engaging through hole 3. FIGS. 5A, 5B, 6A, and 6B show the state in which the retaining shaft end portion 5b of the shaft 5 and the inner periphery of the engaging through hole 3 abut against each other to act as the stopper for preventing the wrenching of the elastic bearing member 4. First, FIGS. 5A and 5B respectively show a state in which the inner peripheral side of the elastic bearing member 4 is twisted clockwise by the steering torque exceeding a fixed level, and a state in which the retaining shaft end portion 5b and the inner periphery of the engaging through hole 3 abut against each other at that time. Further, FIGS. 6A and 6B respectively show a state in which the inner peripheral side of the elastic bearing member 4 is twisted counterclockwise by the steering torque exceeding a fixed level in a direction opposite to that in the case shown in FIG. 5A, and a state in which the retaining shaft end portion 5b and the inner periphery of the engaging through hole 3 abut against each other at that time.

Next, the engaging through hole 3 in the stopper structure is present at the portion where the proximal portion 2a of the joint arm 2 and the joining opening portion 1a of the tubular member 1 are joined in the yoke. For this reason, even if the wall thickness of the tubular member 1 is not made large, it is possible to secure the strength of the joined portion, so that the tubular member 1 can be made thin-walled, and the yoke can be made lightweight. There is a case where the fitting portion of the joint arm 2 is pressed fitted and fixed to the inner periphery of the tubular member 1, and their outer joined end portions are secured by welding or other means. In either case, the joined portions of the tubular member 1 and the joint arm 2 of the yoke are in a superposed state.

What is claimed is:

1. An elastic coupling for a steering apparatus, comprising:
    a thin-walled tubular member having an insertion joining portion;
    a joint arm (2) which is inserted onto and fixed to said insertion joining portion;
    an engaging through hole portion formed in the insertion joining portion in the region of said joint arm for joining said tubular member and said joint arm;
    an elastic bearing member fitted to an inner periphery of said tubular member; and
    a shaft fitted in said tubular member through said elastic bearing member and adapted to abut against an inner peripheral surface of said engaging through hole portion when said shaft is rotated by more than a predetermined rotating angle.

2. An elastic coupling for a steering apparatus according to claim 1, wherein a retaining shaft end portion of said shaft has a substantially elliptical cross section and has a pair of opposing parallel surfaces and a pair of opposing arcuate surfaces, and inclined abutment surfaces are respectively formed at corner portions which are each formed by the parallel surface and the arcuate surface.

3. An elastic coupling for a steering apparatus according to claim 1, wherein said elastic bearing member is constituted by an elastic member and a collar member provided on at least one of an inner peripheral side and an outer peripheral side of said elastic member.

4. An elastic coupling for a steering apparatus, comprising:
    a thin-walled tubular member having a joining opening portion at one end thereof;
    a joint arm having a proximal portion inserted onto, joined and fixed to said joining opening portion;
    an engaging through hole portion located at said joint arm for joining said joining opening portion and said proximal portion;
    a shaft having a retaining shaft end portion insertable in said engaging through hole portion to abut against said engaging through hole portion when said shaft is at an appropriate rotated angle; and
    an elastic bearing member which has elasticity between an outer peripheral side and an inner peripheral side thereof in a direction in which said elastic bearing member is compressed by said shaft which rotates, said shaft being disposed on the inner peripheral side of the bearing member and said tubular member being disposed on the outer peripheral side thereof such that said shaft and said tubular member are incapable of idle rotation.

* * * * *